US010054460B2

(12) United States Patent
Duggan (10) Patent No.: US 10,054,460 B2
(45) Date of Patent: Aug. 21, 2018

(54) PROCESSING MAP-RELATED USER INPUT TO DETECT ROUTE REQUESTS

(71) Applicant: Microsoft Technology Licensing, LLC, Redmond, WA (US)

(72) Inventor: Finbarr Duggan, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 15/082,782

(22) Filed: Mar. 28, 2016

(65) Prior Publication Data

US 2017/0276505 A1    Sep. 28, 2017

(51) Int. Cl.
*G01C 21/36* (2006.01)
*G06F 17/30* (2006.01)
*G06F 3/0488* (2013.01)

(52) U.S. Cl.
CPC ....... *G01C 21/3605* (2013.01); *G01C 21/367* (2013.01); *G01C 21/3664* (2013.01); *G06F 3/04883* (2013.01); *G06F 17/30241* (2013.01)

(58) Field of Classification Search
None
See application file for complete search history.

(56) References Cited

U.S. PATENT DOCUMENTS

| 7,831,387 | B2 | 11/2010 | Golding et al. |
| 7,886,236 | B2 | 2/2011 | Kolmykov-Zotov et al. |
| 8,219,309 | B2 | 7/2012 | Nirhamo |
| 8,666,663 | B2 | 3/2014 | Kudo |
| 8,677,285 | B2 | 3/2014 | Tsern et al. |
| 9,157,758 | B2 * | 10/2015 | Van Seggelen .... G01C 21/3484 |

(Continued)

FOREIGN PATENT DOCUMENTS

| CN | 103383262 A | 11/2013 |
| JP | 2012215869 A | 11/2012 |

(Continued)

OTHER PUBLICATIONS

"International Search Report and Written Opinion Issued in PCT Application No. PCT/US17/023495", dated May 31, 2017, 11 Pages.

(Continued)

*Primary Examiner* — Thomas G Black
*Assistant Examiner* — Ce Li Li
(74) *Attorney, Agent, or Firm* — Patent GC LLC (57) ABSTRACT

An application processes user input with respect to a geographic map to generate annotations associated with locations on that geographic map. Such annotations can include user entered characters and graphics, including curves and lines. The application distinguishes between user inputs that are annotations and user inputs that indicate a request for a route between two locations. In response to user input with respect to a geographic map, the application determines whether the user input is a request for a route. When performing such comparisons, the application uses locations and road segments that are presented at a zoom level corresponding the zoom level applied at the time the user input for the annotation was received. After determining that a user input corresponds to a request for a route, the application generates data describing a route. The application can present a plurality of candidate routes to the user for selection.

20 Claims, 7 Drawing Sheets

(56) References Cited

U.S. PATENT DOCUMENTS

| | | | |
|---|---|---|---|
| 9,182,233 B2 | 11/2015 | Weng et al. | |
| 9,372,092 B2 | 6/2016 | Skillman et al. | |
| 9,417,083 B2* | 8/2016 | Yamaguchi | G01C 21/3605 |
| 9,671,246 B2* | 6/2017 | Boschker | G01C 21/3484 |
| 2004/0172191 A1 | 9/2004 | Vitikainen et al. | |
| 2008/0184173 A1* | 7/2008 | Sutanto | G06F 3/0481 |
| | | | 715/863 |
| 2009/0132941 A1* | 5/2009 | Pilskalns | G06F 17/3087 |
| | | | 715/764 |
| 2010/0023259 A1 | 1/2010 | Krumm et al. | |
| 2010/0082233 A1 | 4/2010 | Arita | |
| 2011/0320114 A1* | 12/2011 | Buxton | G01C 21/3608 |
| | | | 701/439 |
| 2013/0096819 A1 | 4/2013 | Tarnok | |
| 2013/0151150 A1* | 6/2013 | Yu | G01C 21/343 |
| | | | 701/537 |
| 2013/0211719 A1* | 8/2013 | Boschker | G01C 21/3484 |
| | | | 701/533 |
| 2014/0019045 A1 | 1/2014 | Mcbride et al. | |
| 2014/0088870 A1* | 3/2014 | Varoglu | G01C 21/3614 |
| | | | 701/533 |
| 2014/0129976 A1* | 5/2014 | Beaurepaire | G01C 21/367 |
| | | | 715/788 |
| 2014/0156189 A1* | 6/2014 | Hart | G01C 21/3484 |
| | | | 701/538 |
| 2014/0372031 A1* | 12/2014 | Canner | G01C 21/206 |
| | | | 701/533 |
| 2015/0169524 A1* | 6/2015 | Dayan | G06Q 10/101 |
| | | | 715/201 |
| 2015/0323339 A1* | 11/2015 | Yamaguchi | G01C 21/3605 |
| | | | 701/533 |
| 2016/0283516 A1* | 9/2016 | Barnes | G06F 17/30241 |
| 2016/0306687 A1* | 10/2016 | Biswas | H04W 4/00 |

FOREIGN PATENT DOCUMENTS

| | | |
|---|---|---|
| WO | 2013114558 A1 | 8/2013 |
| WO | 2014067951 A1 | 5/2014 |
| WO | 2015022558 A1 | 2/2015 |
| WO | 2015026122 A1 | 2/2015 |

OTHER PUBLICATIONS

Zugaldia, Antonio, "Introducing the Directions Library for Android", Published on: Jan. 13, 2016, Available at: https://www.mapbox.com/blog/android-directions-library/.

* cited by examiner

PROCESSING MAP-RELATED USER INPUT TO DETECT ROUTE REQUESTS

BACKGROUND

Applications that provide access to geographic maps are commonly available on computer systems, including devices such as desktop computers, tablet computers, and mobile phones. Such applications may provide a variety of searching and routing information to users.

For example, an application may receive input data describing a current location information and a desired location and generate output data describing a route from the current location to the desired location. Some applications generate routes for driving an automobile or other motor vehicle on roads. Some applications generate routes for walking, taking public transportation, or taking other forms of transport.

SUMMARY

This Summary is provided to introduce a selection of concepts in a simplified form that are further described below in the Detailed Description. This Summary is intended neither to identify key or essential features, nor to limit the scope, of the claimed subject matter.

An application processes user input with respect to a geographic map to generate annotations associated with locations on that geographic map. Such annotations can include user entered characters and graphics, including curves and lines. The application distinguishes between user inputs that are annotations and user inputs that indicate a request for a route between two locations.

In particular, in response to user input of a curve or line with respect to a geographic map, the application determines whether the curve or line is a request for a route. For example, the application can compare distances between points along a curve and road segments of a route between two locations corresponding to a start point and an end point of the curve. As another example, the application can compare a shape of a curve to a straight line between two locations corresponding to a start point and an end point of the curve. When performing such comparisons, the application uses locations and road segments that are presented at a zoom level corresponding the zoom level applied at the time the user input for the annotation was received.

After determining that a user input corresponds to a request for a route, the application generates data describing a route. The application can generate different routes using a number of different route generation techniques. The application can present a plurality of candidate routes to the user for selection.

In the following description, reference is made to the accompanying drawings which form a part hereof, and in which are shown, by way of illustration, specific example implementations. Other implementations may be made without departing from the scope of the disclosure.

DETAILED DESCRIPTION

Figure 1:
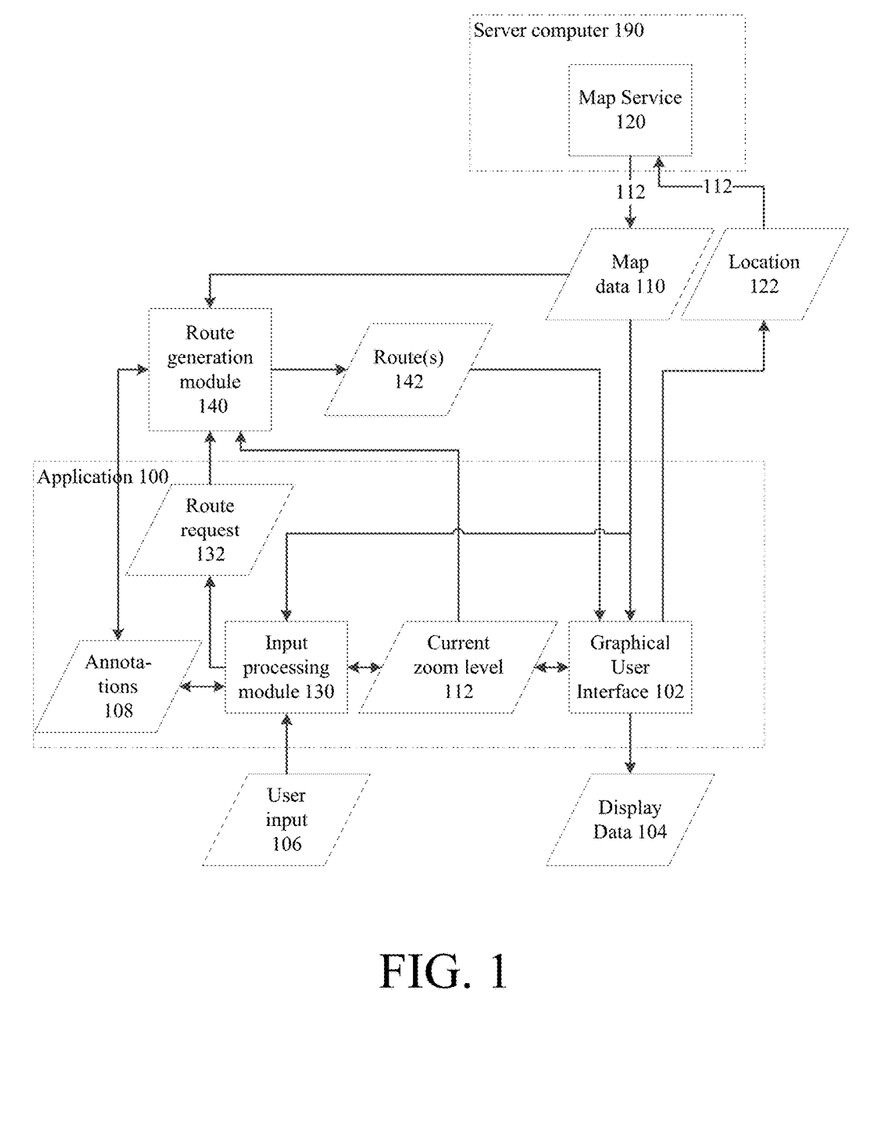
FIG. 1 is a block diagram of an example computer system configured to support applications that generate routes for, and support annotation of, geographic maps.

FIG. 1 is a block diagram of an example computer system configured to support applications that generate routes for, and support annotation of, geographic maps.

The computer system includes an end user computer 180 running an application 100. The application is a computer program running on the end user computer that configures the end user computer to be responsive to user input 106 to allow an end user to interactively annotate and/or receive route information in connection with a geographic map represented by map data 110 provided by a map service 120.

The application 100 configures the end user computer to provide a graphical user interface 102 which presents display data 104 including a geographic map on one or more output devices (not shown), and to provide an input processing module 130 which processes user input 106 from one or more input devices (not shown). An illustrative example implementation of the graphical user interface is described in more detail below in connection with FIG. 2.

The input processing module 130 configures the end user computer to, in response to user input 106, generate annotations 108 associated with a geographic map represented by map data 110. Such annotations can include, for example, user entered characters and graphics, including curves and lines, entered on the geographic map as presented by the graphical user interface 102. Thus, each annotation is defined by at least its content and its location on the geographic map. The location can include information indicating the zoom level 112 at which the geographic map was rendered and presented at the time the annotation was input by the user. An illustrative data structure representative of annotation data 108 also is described in more detail below in connection with FIG. 3. Such annotations can be stored for a user persistently in data files, whether on the end user computer or on another computer, along with other files and data that are stored for the user.

The graphical user interface 102 of the application generates display data 104 based on at least a rendering of the map data 110 at a current zoom level 112. The zoom level can be based on user input 106, or can be inferred from location information, or can be determined based on settings, such as a default zoom level.

The map data can include a variety of data that describe a geographic map, such as both natural and manmade features, including but not limited to elevation information, landmarks, buildings, roads of various types, walking paths, waterways, public transportation, railways, bus routes, shipping routes, and the like. An illustrative data structure representative of a geographic map is described in more detail below in connection with FIG. 3.

The display data 104 also can be based in part on the user input 106, so that information such as zoom level 112, location 122 and annotations 108 also can be presented by the graphical user interface 102.

The application 100 accesses map data 110 from a map service 120 based on a location 122. A suitable map service 120 is a computer running a computer program that manages access to map data stored in computer storage. In response to an input of data describing a location, the map service provides map data corresponding to the location. The location 122 can be based in part on the user input 106. The location can be defined by a particular point, a plurality of points, a range of values in one or more dimensions of a geographic map, or other information from which the application can specify at least a two-dimensional area within a geographic map. The location information 122 also can include the zoom level 112, or the zoom level can be inferred from the location information, or can be determined based on settings, such as a default zoom level.

As described in more detail herein, the input processing module 130 processes the user input 106 so as to distinguish whether an annotation, such as a curve or line, which has been input is either an annotation or a request for route information. The input processing module 130 also generates route requests 132 to a route generation module 140 for annotations which are determined to be requests for route information. The route generation module, given the route request 132, map data 110 and a current zoom level 112, and optionally annotation data 108, identifies one or more candidate routes 142. Data describing the candidate routes are input to the graphical user interface 102, which can generating a rendering of the candidate routes on a rendering of the geographic map, based on the map data 110, the candidate routes 142 and current zoom level 112. The graphical user interface 102 presents this rendering as part of the display data 104, and can provide a variety of ways for a user to further interact with the candidate routes that are presented, using conventional techniques.

In one example deployment, the map service 120 is a server computer (shown as a dashed line 190, representing one or more actual computers) running a computer program that manages access to map data stored in storage, where the server computer is accessible by a client computer over a computer network 112 such as the internet. The client computer (not shown) runs the application 100. The application running on the client computer communicates with the map service 120 over the computer network 112. The computer network can be any computer network supporting interaction between client computers and the server computer, such as a local area network or a wide area network, whether private and/or publicly accessible, and can include wired and/or wireless connectivity. The computer network can be implemented using any of a number of available network communication protocols, including but not limited to Ethernet and TCP/IP. In such a deployment the map service can support a plurality of different instantiations of the application, as well as variants of that application, deployed on multiple different client computers.

In another example deployment, the client computer runs a browser application through which the graphical user interface 102 of the application is presented to the user on a display of the client computer, and through which user inputs 106 are received from input devices of the client computer. The client computer receives data from the server computer for processing by the browser application to implement the graphical user interface 102. In some implementations with a browser application, the data received by the browser application includes computer programs processed by the browser application that implement the operation of one or more modules of the graphical user interface 102, and optionally the input processing module 130, as described herein.

In some implementations, the modules of the application as described herein reside on a server computer 190 and a browser application on a client computer presents display data 104 and transmits user input 106 to the server computer 190.

In deployments using a client computer and a server computer, the route generation module 140 can reside on either the server computer 190 or on the client computer. When residing on a server computer, the route generation module 140 through requests and responses over the computer network 112 to provide route requests 132 and receive data describing candidate route(s) 142. Also, with deployments using a client computer and a server computer, multiple client computers can be configured with applications that access the server computer 190.

In another example deployment, the client computer runs both a computer program for the map service and a computer program for the application. In such a deployment, the map service and application can be combined into a single computer program.

The client computer and/or the server computer can be implemented using a general purpose computer such as described below in connection with FIG. 7.

For a server computer, the computer(s) supporting the map service 120 and optionally route generation module 140 is/are configured with sufficient processors, memory and storage to support storage of a large amount of map data, as well as access by multiple clients in a transactional communication protocol, to request map data from storage and optionally route generation based on that map data.

For a client computer, example computer types include, but are not limited to, a tablet computer, a slate computer, a notebook computer, a desktop computer, a virtual desktop computer hosted on a server computer, a handheld computer, and a mobile phone including a computer and applications. With a client computer with a touchscreen interface, user input 106 can include curves and/or lines input by a user touching the touchscreen with a finger, stylus or other instrument. Such user input 106 can originate from a keyboard, indirect pointer device such as a mouse, trackpad, trackball, direct pointer device such as a touchscreen or tablet, or natural user interface such as with gesture recognition, eye tracking, voice recognition and the like.

Figure 2:
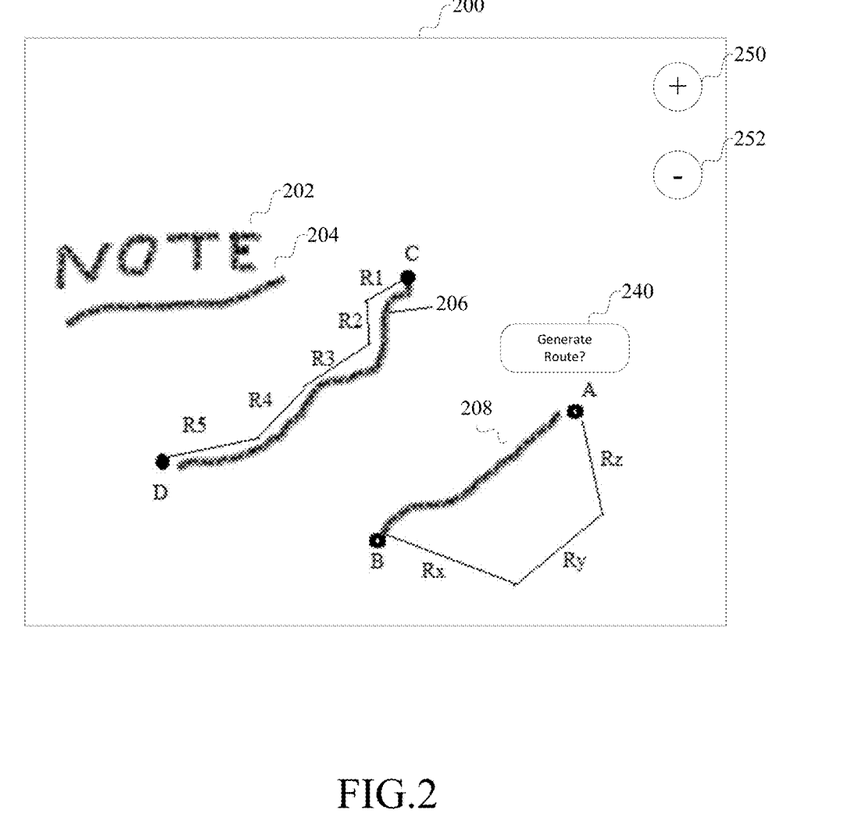
FIG. 2 is an illustration of an example graphical user interface for an application for generating routes for, and supporting annotation of, geographic maps.

Turning now to FIG. 2, an illustrative example of display data for the graphical user interface 102 will now be described.

In FIG. 2, an image of a geographic map, generated by rendering map data at a current zoom level, is displayed in a display area 200. In this example, the image of the rendered map data includes a set of road segments R1 to R5, between locations C and D on the map. The image of the rendered map data also includes an indication of locations A and B on the map, with road segments Rx, Ry and Rz connecting them. The image of rendered map data may exist in memory for a larger area than what is currently displayed. Controls 250 and 252 may be displayed. In response to user input with respect to these controls, the input processing module 130 increases or decreases the current zoom level 112, and the graphical user interface 102 updates the display data 104 accordingly.

Using input devices, a user can provide user input which is processed by the input processing module to define annotations with respect to the displayed geographic map. For example, a user may write a note, e.g., "Note", as indicated at 202, which is underlined, as indicated at 204. The user also may draw a curve 206 between locations C and D in relative proximity to the road segments R1 to R5. The user also may draw a relatively straight line 208 between locations A and B.

As described in more detail below, the input processing module (130 of FIG. 1) processes these user inputs so as to distinguish whether an annotation, such as a curve or line that has been input, is either an annotation or a request for route information. With such processing, the underline 204 is classified as an annotation, whereas the curve 206 and the line 208 are classified as requests for a route between locations, in response to which a candidate route between the locations is generated. In one implementation, before generating a route based on an input classified as a route request, the graphical user interface can display a prompt to a user, seeking verification that a route request has been made, such as shown at 240. In response to user input verifying that the input is a route request, the application can generate a request to the route generation module to generate one or more candidate routes.

Figure 3:
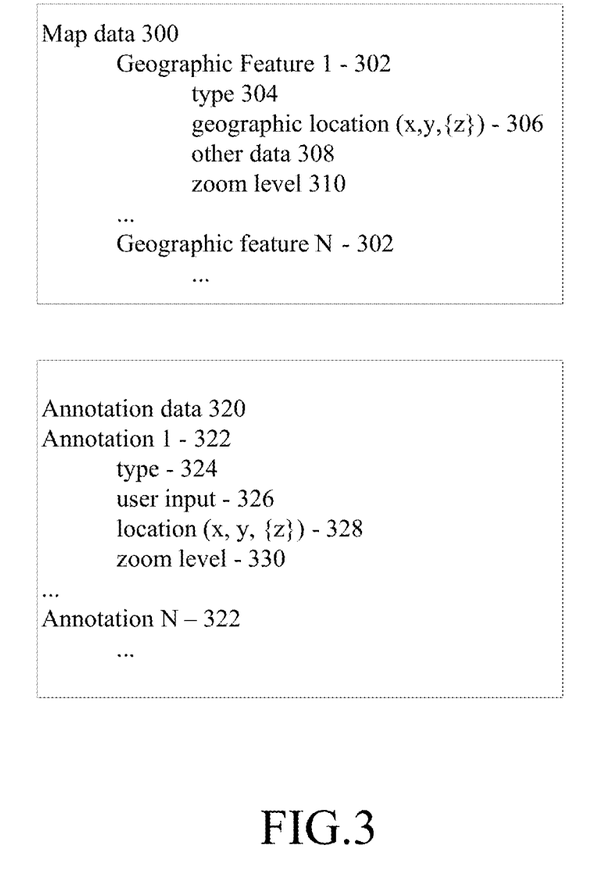
FIG. 3 is a diagram illustrating data structures for storing annotation data and map information.

Referring now to FIG. 3, illustrative examples of data structures used by the application will now be described. The data representing maps and annotations can be stored in computer storage in a number of different formats. On the one hand, there can be a file format for one or more data files for storing data map data or annotation data in persistent storage. On the other hand, there can be one or more data structures stored in memory for providing access to such data by the application during use of the maps. The file format can be and typically is different from the data structure that is stored in memory, yet both store essentially the same data. When such data is read from a data file by an end user application, the end user application may generate corresponding data structures in memory. Data structures in memory, in turn, are processed and stored into the data files at periodic intervals and/or in response to an instruction received from an end user.

In FIG. 3, in general, and whether in a data file in persistent storage or data structure in memory, map data 300 includes data representing geographic features 302. Each geographic feature 302 has a type 304, geographic location 306, which can include a location, such as longitude (x), latitude (y) and optionally elevation (z), and other data 308 relevant to the type of geographic feature. For geographic features used by the route generation module, such as road segments, buildings and the like, the data for such features can include data indicating a zoom level 310 at which the feature is displayed. This zoom level can be inferred from other data 308. As an example of other data 308, data for a road segment can include, for example, end points, length (in geographic distance), a list of additional points that further define the road segment, a level (such as a highway, major road, minor road, dirt road, and the like), a direction of travel, a number of lanes, and the like. As an example, the level of a road segment can be used to determine whether the road segment is displayed at a given zoom level.

Annotation data 320 includes data representing annotations 322. Each annotation 322 has a type 324, such as a character, symbol, string, route request, or other object. The annotation stores data 326 representative of the user's input. The annotation also has a location 328 based on a geographic location, such as longitude (x), latitude (y) and optionally elevation (z), with respect to the geographic map on which the annotation was drawn. A zoom level 330 indicates a zoom level at which the corresponding map was displayed at the time the annotation was input.

The data 326 representing the user's input can take a number of different possible forms. In one implementation, an annotation can be represented as a path connecting a set of geographic locations or points, where a point has a latitude (x), longitude (y) and optionally an elevation (z) or even a distance (z) off ground level. The representation of the geographic location, such as the granularity or precision of the values, also can be dependent on zoom level. Using location and height information can closely correlate the annotation and map.

In another implementation, an annotation can be represented as an image with non-annotated portions transparent. The size of the image can be defined by a bounding box enclosing the annotation data. The zoom level 330 associated with the image ensures the image correlates with the size of the map as displayed at the time the annotation was entered.

In another implementation, a portion of an annotation can be represented as one or more geographic locations or points, and another portion of the annotation can be represented as an image.

In some implementations, where an annotation is represented in whole or in part by a path of geographical locations or points, additional information such as the thickness, color, transparency and other visual effects associated with the path can be stored as part of the data representing the annotation.

It should be understood that the foregoing is merely an illustrative example, and that various other information can be stored as part of the map data or annotation data, depending on implementation.

Figure 4:
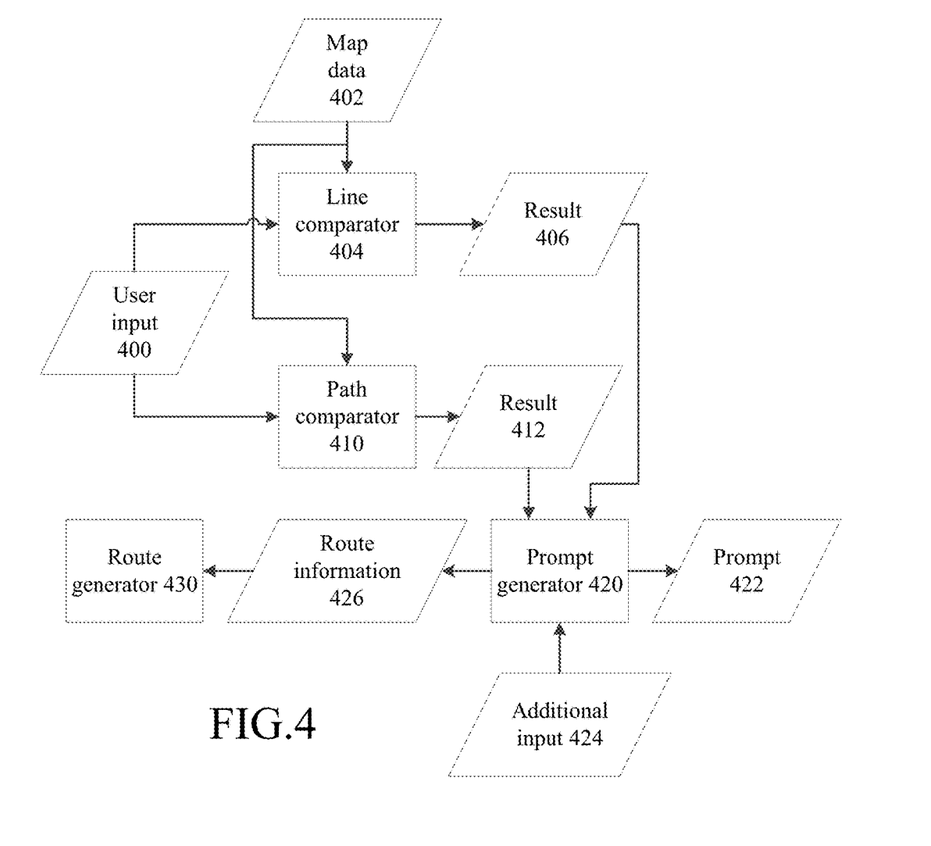
FIG. 4 is a data flow diagram of an example implementation of an input processing module.

Turning now to FIG. 4, a data flow diagram of an example implementation of an input processing module for the application, which distinguishes whether an annotation, such as a curve or line, which has been input is either an annotation or a request for route information, will now be described. In this example implementation, an annotation can be interpreted as a request for a route if the input is either a. a sufficiently straight line between two material points on the map, or b. a curve closely following a route between two material points on the map.

In FIG. 4, the user input 400 includes annotation data corresponding to a user input that has been received by the input processing module from an input device, including a zoom level at which the map was displayed at the time the user input was received. Map data 402 includes map data from the displayed region of map that includes the annotation.

A line comparator 404 processes the user input 400 to determine whether the user input is a request for a route between the endpoints of the line. More details of an example implementation of a line comparator are provided below in connection with FIG. 5. Generally speaking, the line comparator computes a measure indicative of whether the input is a sufficiently straight line. For example, this measure can be compared to a threshold. Such a threshold can be user defined and/or automatically adjusted through machine learning operations. Based on at least this computed measure, the line comparator 404 outputs a result 406 indicating whether the input is a request for a route.

In computing the result 406, the line comparator also can take other factors into consideration to determine that an input is a request for a route. For example, information about geographic features associated with the endpoints of the input can be used. For example, the distances of geographic features visible in the display data at the current zoom level and the start and endpoints can be determined. Types of, or other information about, geographic features associated with the start and end points, also can be considered to determine whether the input indicates a request for a route. For example, if the start point or end point is at or near a feature such as the user's home, the user's place of employment or other user's regular activity, important location, or the current location as rendered on the map, then the user input is more likely to be a request for a route from or to that location. A history of locations for which users have requested routes also can be used to determine a likelihood that an input is a request for a route.

A path comparator 410 processes the user input 400 to determine whether the user input is a request for a route similar to a path specified by the input. More details of an example implementation of a path comparator are provided below in connection with FIG. 6. The path comparator determines whether the input is sufficiently close to a route along road segments between geographic features at its endpoints, where the road segments and geographic features considered are visible in the displayed map that the zoom level at which the user input was received. Generally speaking, the path comparator can determine, for points along the input path, a closest road segment to each point, visible at the zoom level of the input. These road segments can be analyzed to ensure they define a route between the start and endpoints corresponding to the input path. For each point and corresponding closest road segment, the path comparator computes a distance between the point and the road segment. A measure based on a function of these computed distances, such as a sum or average, is computed. Based on at least this measure, the path comparator 410 outputs a result 412 indicating whether the input is a request for a route. For example, the computed measure can be compared to a threshold. Such a threshold can be user defined and/or automatically adjusted through machine learning operations. The result 412 also can indicate the road segments matched to the path defined by the input. These road segments can be offered as a candidate route 142 (FIG. 1).

Similar to the line comparator, in computing the result 412 the path comparator 410 also can take other factors into consideration to determine that an input is a request for a route. For example, information about geographic features associated with the endpoints of the input can be used.

In the example implementation of FIG. 4, if either the line comparator 402 or path comparator 410 outputs an indication that the input is a request for a route, then a prompt generator 420 generates a prompt 422 to be presented to the user through the graphical user interface (not shown). The prompt requests verification from the user that the user input is a request for a route. For example a prompt can be generated in the form of "Would you like route information between [Feature 1] and [Feature 2] [by way of [Feature 3]]?" where Feature 1 and Feature 2 are endpoints of the curve and Feature 3 is an optional way point along the curve if the path comparator so indicates. One or more templates for prompts can be used to generate such prompts based on geographic features of the map and the user input.

In response to additional user input 424 in response to the prompt, the annotation data for the processed input is updated (to indicate the annotation is either a route request or merely an annotation on the map). If the additional user input 424 confirms the annotation is a route request, then the prompt generator can output route information 426 to a route generation module 430 to generate a route. For example, such information can include geographic features corresponding to the endpoints of the input line or curve, and/or any road segments or waypoints defined by the road segments associated with the input line or curve.

Flowcharts of operation of example implementations of an input processing module with a line comparator and a path comparator will now be described in connection with FIGS. 5 and 6.

Figure 5:
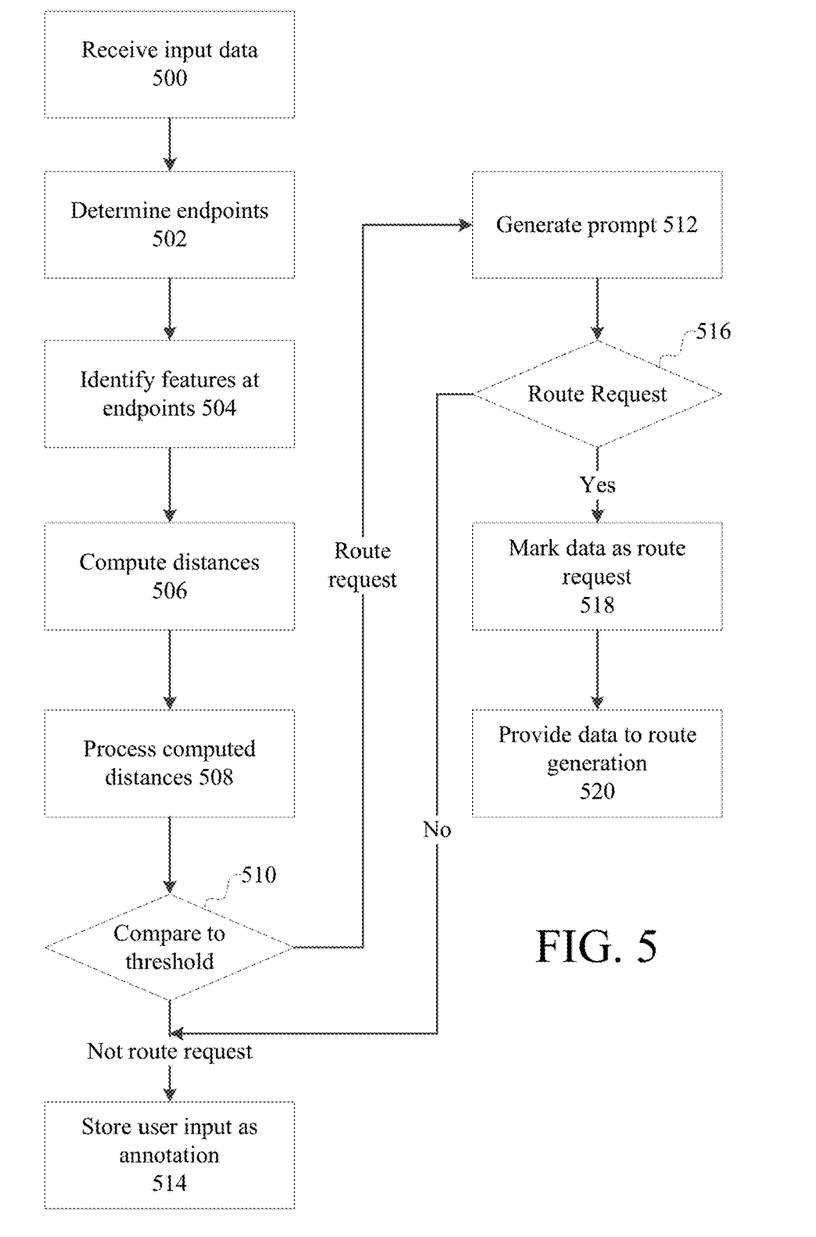
FIG. 5 is a flow chart describing a first example implementation of processing an annotation to determine if the annotation represents a request for a route.

With reference to FIG. 5, the input processing module receives 500 input data including map data and data relating to an annotation, including path data and a zoom level. The endpoints represented by the input data are then determined 502. Geographic features visible at the current zoom level and associated with the endpoints of the path data are identified 504. For example, depending on the zoom level, such a feature can be a city or can be a building or other landmark, or a road segment. A measure of the difference between the path and a straight line between the endpoints defined by the path is computed 506. This measure of the difference between is compared 510 to a threshold. If the comparison indicates that the specified path is sufficiently close to a straight line, then a prompt to the user is generated 512. Otherwise, no prompt is generated and the input data is stored 514 as an annotation. In response to user input, as indicated at 516, the input data is marked 518 as a request for a route, or stored 514 as an annotation. If the input data is marked as a request for a route, data is provided 520 to a route generation module.

The measure of difference can be calculated using any of a number of techniques. For example, points along the path can be selected and a distance can be computed between each point and its closest corresponding point on a straight line. A function of these computed distances, such as a sum or average, can be the measure of difference. As another example, given a path between two points, tortuosity is a property of that path which indicates a degree of variation of the path from a straight line. There are a number of ways to measure tortuosity. For example, tortuosity of the path can be defined as a function of an arc-chord ratio, which is a measure of a length along the path to a length of a line between the endpoints of the path. As another example, a function can consider a rate of change of curvature of a path.

Figure 6:
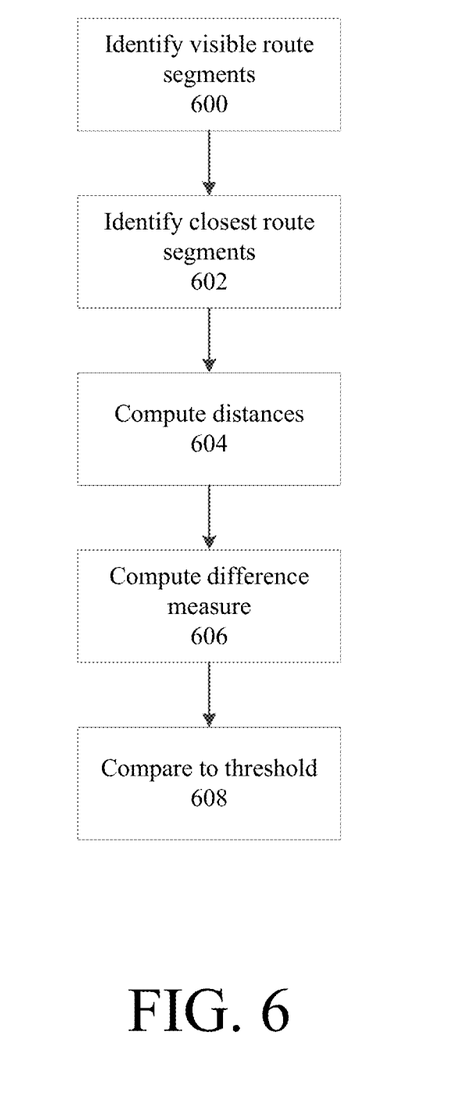
FIG. 6 is a flow chart describing a second example implementation of processing an annotation to determine if the annotation represents a request for a route.

Turning now to FIG. 6, comparison of an input path to a specific route also can be performed. Such a comparison can be done, for example, after step 510 in FIG. 5 and before step 514 in FIG. 5, if the straight line test fails at step 510 in FIG. 5. If the result of the comparison is positive, then processing can return to step 512 in FIG. 5. If the result of the comparison is negative, then processing can return to step 514 in FIG. 5.

In addition to the geographic features associated with the endpoints having been identified at 504, the process of FIG. 6 identifies 600 road segments, or other route segments, visible at the current zoom level between the two endpoints. A closest road segment is identified 602 for points along the input path, and the distance from the point to that road segment is determined 604. A measure of difference between the specified path and the route segments is computed 606 using the computed distances. This measure can be compared 608 to a threshold to determine whether the input path is sufficiently close to a route that is closest to the input path.

In another implementation, the comparison of a path to a specific route can include a detection of waypoints at turning points or vertices along the path. Turning points can be identified, for example, by computing a first derivative of the path and identifying locations along the path where this first derivative is equal to zero or undefined, indicating a local minimum or maximum. For each identified turning point, a way point is defined. A way point corresponding to a turning point can be any significant geographic feature which is at a location sufficiently close to the identified turning point and which is visible at the zoom level used at the time the user input was received. A route through the way points using road segments visible at the current zoom level is determined. A distance of points from the path input to the road segments defined between the way points is then determined. A measure of difference between the specified path and the route through the determined way points is computed using the computed distances. This measure can be compared to a threshold to determine whether the input path is sufficiently close to a route through the waypoints inferred from the input path.

By processing user inputs for making annotations on a geographic map, so as to detect requests for routes between locations on that map, an application can provide a more productive interactive experience for users of geographic maps. The application allows users to enter both annotations and requests for route information with the same kind of input. Data about such an input, including whether the input indicates a request for a route, can be further stored as an annotation with respect to a geographic map for future use. By incorporating information about visible features of the geographic map into such detection, such as by using the current zoom level, the accuracy of such detection can be improved.

Figure 7:
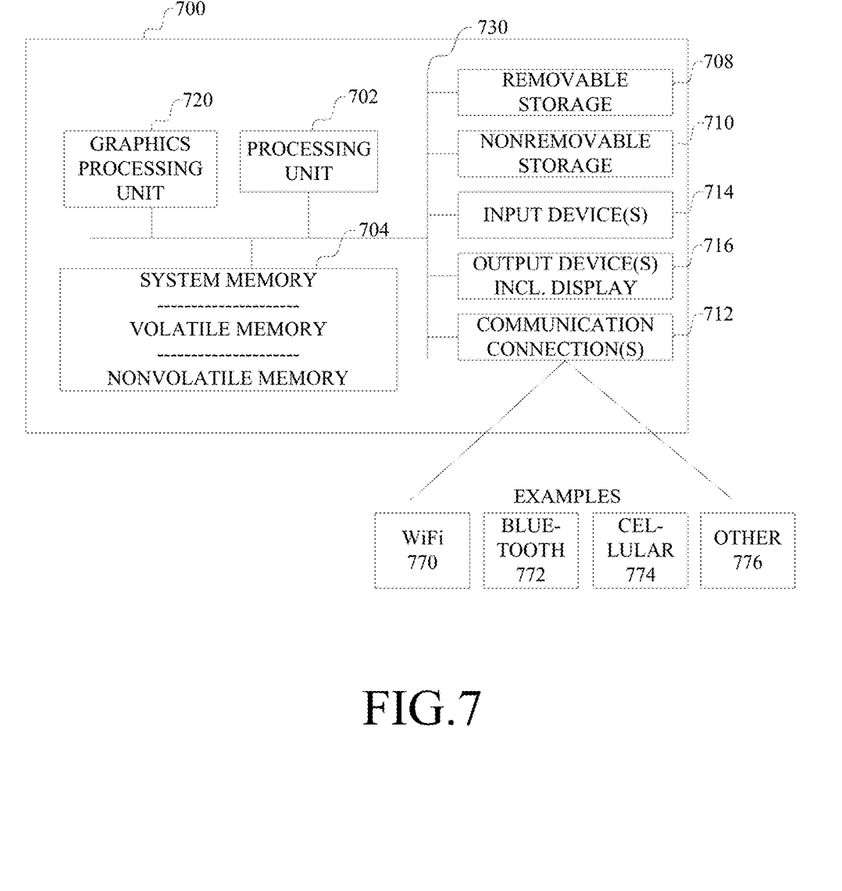
FIG. 7 is a block diagram of an example computer.

Having now described an example implementation, FIG. 7 illustrates an example of a computer with which such techniques can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 7, a computer 700 includes at least one processing unit 702 and memory 704. The computer can have multiple processing units 702 and multiple devices implementing the memory 704. A processing unit 702 can include one or more processing cores (not shown) that operate independently of each other. Additional co-processing units also can be present in the computer. The memory 704 may include volatile devices (such as dynamic random access memory (DRAM) or other random access memory device), and nonvolatile devices (such as a read-only memory, flash memory, and the like) or some combination of the two. Other storage, such as dedicated memory or registers, also can be present in the one or more processor units. The computer 700 can include additional storage, such as storage devices (whether removable or non-removable) including, but not limited to, magnetically-recorded or optically-recorded disks or tape. Such additional storage is illustrated in FIG. 7 by removable storage device 708 and non-removable storage device 710. The various components in FIG. 7 are generally interconnected by an interconnection mechanism, such as one or more buses 730.

A computer storage medium is any medium in which data can be stored in and retrieved from addressable physical storage locations by the computer. A computer storage medium thus can be a volatile or nonvolatile memory, or a removable or non-removable storage device. Memory 704, removable storage 708 and non-removable storage 710 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 700 may also include communications connection(s) 712 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 712 are devices, such as a wired network interface, wireless network interface, radio frequency transceiver, e.g., WiFi 770, cellular 774, long term evolution (LTE) or Bluetooth 772, etc., transceivers, navigation transceivers, e.g., global positioning system (GPS) or Global Navigation Satellite System (GLONASS), etc., or other devices 776 that interface with communication media to transmit data over and receive data from the communication media.

The computer 700 may have various input device(s) 714 such as a pointer device, keyboard, touch-based input device, pen, camera, microphone, sensors, such as accelerometers, thermometers, light sensors and the like, and so on. The computer 700 may have various output device(s) 716 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 710, communication connections 712, output devices 716 and input devices 714 can be integrated within a housing with the rest of the computer, or can be connected through various input/output interface devices on the computer, in which case the reference numbers 710, 712, 714 and 716 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 7.

The various modules and data structures of FIGS. 1-4, the flowcharts of FIGS. 5-6, as well as any operating system, file system and applications on a computer in FIG. 7, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer, comprises a processing system comprising one or more processing units and storage, the storage comprising computer program code that, when executed by the processing system, configures the processing system to include a graphical user interface and an input processing module. The graphical user interface has an input receiving map data and a zoom level and an output providing display data including a graphical representation of the map data at the zoom level for presentation. The input processing module has an input receiving user input describing an annotation with respect to a location on the graphical representation of the map data and an output providing annotation data based on the user input. The annotation data represents the annotation and includes a geographic location corresponding to the location of the user input on the graphical representation of the map and the zoom level. The input processing module processes the user input to determine whether the user input corresponds to a request for a route between geographic locations corresponding to the user input. In response to a determination that the user input corresponds to a request for a route, the input processing module generates one or more routes based on least the map data and the geographic locations corresponding to the user input.

In another aspect, a computer-implemented process includes processing, using a processor, user input in memory, the user input indicative of an annotation with respect to a location on a graphical representation of map data presented by a graphical user interface at a zoom level. The process includes generating, in memory, wherein the annotation data represents the annotation and includes a geographic location corresponding to the location of the user input on the graphical representation of the map and the zoom level. The process includes determining whether the user input corresponds to a request for a route between geographic locations corresponding to the user input. In response to a determination that the user input corresponds to a request for a route, one or more routes are generated based on least the map data and the geographic locations corresponding to the user input.

In another aspect, a computer comprises a means for processing an annotation with respect to a location on a graphical representation of map data presented by a graphical user interface at a zoom level to detect a request for a route and means, operative in response to detection of a request for a route, generating a route.

In another aspect, a computer comprises a means for processing an annotation with respect to a location on a graphical representation of map data presented by a graphical user interface at a zoom level to detect a request for a route and means, operative in response to detection of a request for a route, transmit a request for a route to a route generation module.

In any of the foregoing aspects, an input processing module can be further configured to store the annotation data according to the determination that the user input corresponds to a request for a route.

In any of the foregoing aspects, the determination that the user input corresponds to a request for a route can be stored in the annotation data.

In any of the foregoing aspects, to determine whether the user input corresponds to a request for a route, the user input can be compared to a straight line between end points defined by the user input.

In any of the foregoing aspects, to determine whether the user input corresponds to a request for a route, tortuosity of the user input can be computed.

In any of the foregoing aspects, to determine whether the user input corresponds to a request for a route, the user input can be compared to closest visible road segments between end points defined by the user input.

In any of the foregoing aspects, to determine whether the user input corresponds to a request for a route, the user input can be compared to a route between end points and through waypoints defined by the user input.

In any of the foregoing aspects, to determine whether the user input corresponds to a request for a route, the user can be prompted for additional input indicating whether the user input is a request for a route.

In any of the foregoing aspects, the annotation data can be stored according to the additional input indicating that the user input corresponds to a request for a route.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A computer, comprising:
a processing system comprising one or more processing units and storage, the storage comprising computer program code that, when executed by the processing system, configures the processing system to comprise:
a graphical user interface having an input receiving map data and a zoom level and an output providing display data including a graphical representation of the map data at the zoom level for presentation;
an input processing module having an input receiving user input representing a curve or line with respect to a location on the graphical representation of the map data at the zoom level, and an output;
the input processing module being configured to process the user input to:
determine whether the curve or line corresponds to an input for an annotation or a request for a route between geographic locations corresponding to the location of the curve or line on the graphical representation of the map data at the zoom level, using a function comparing the curve or line to the map data at the zoom level;
in response to determining that the curve or line corresponds to the request for the route, generate data representing one or more routes between the geographical locations corresponding to the curve or line, based on at least the map data and the geographic locations corresponding to the curve or line; and
in response to determining that the curve or line corresponds to the annotation, generating annotation data based on the curve or line, and storing the generated annotation data in the storage through the output, wherein the annotation data comprises a data structure including data based on the user input and representing the annotation, data representing a geographic location corresponding to the location of the curve or line on the graphical representation of the map data, and the zoom level.

2. The computer of claim 1, wherein, to determine whether the curve or line corresponds to a request for a route, the input processing module is configured to compare the curve or line to a straight line between end points defined by the curve or line.

3. The computer of claim 1, wherein, to determine whether the curve or line corresponds to a request for a route, the input processing module is configured to compare the curve or line to closest road segments visible in the graphical representation of the map at the zoom level between end points defined by the user input.

4. The computer of claim 1, wherein, to determine whether the curve or line corresponds to a request for a route, the input processing module is configured to compare the curve or line to a route between end points and through waypoints defined by the curve or line.

5. The computer of claim 1, wherein, to determine whether the curve or line corresponds to a request for a route, the input processing module is configured to prompt the user for additional input indicating whether the curve or line is a request for a route.

6. The computer of claim 5, wherein the input processing module is configured to store the annotation data in response to the additional input indicating that the curve or line is not a request for a route.

7. The computer of claim 1, wherein, to determine whether the curve or line corresponds to a request for a route, the input processing module is configured to compare the curve or line to locations and road segments presented at the zoom level applied to the map at the time the curve or line was received.

8. An article of manufacture comprising:
at least one computer storage medium,
computer program instructions stored on the at least one computer storage medium which, when processed by a processing system of a computer, the processing system comprising one or more processing units and storage, configures the computer to comprise:
a graphical user interface having an input receiving map data and a zoom level and an output providing display data including a graphical representation of the map data at the zoom level for presentation;
an input processing module having an input receiving user input representing a curve or line at a location on the graphical representation of the map data at the zoom level;
the input processing module being configured to process the user input to:
determine, using a function comparing the curve or line to the map data at the zoom level, whether the curve or line corresponds to an input for an annotation or a request for a route between geographic locations corresponding to the location of the curve or line on the graphical representation of the map data at the zoom level;
in response to determining that the curve or line corresponds to the request for the route, generate data representing one or more routes between the geographical locations corresponding to the curve or line, based on at least the map data and the geographic locations corresponding to the curve or line; and
in response to determining that the curve or line corresponds to the annotation, generate annotation data based on the curve or line, and storing the generated annotation data in the storage, wherein the annotation data comprises a data structure including data based on the user input and representing the annotation, data representing a geographic location corresponding to the location of the curve or line on the graphical representation of the map data, and the zoom level.

9. The article of manufacture of claim 8, wherein, to determine whether the curve or line corresponds to a request for a route, the input processing module is configured to compare the curve or line to a straight line between end points defined by the curve or line.

10. The article of manufacture of claim 8, wherein, to determine whether the curve or line corresponds to a request for a route, the input processing module is configured to compare the curve or line to closest road segments visible in the graphical representation of the map at the zoom level between end points defined by the curve or line.

11. The article of manufacture of claim 8, wherein, to determine whether the curve or line corresponds to a request for a route, the input processing module is configured to compare the curve or line to a route between end points and through waypoints defined by the curve or line.

12. The article of manufacture of claim 8, wherein, to determine whether the curve or line corresponds to a request for a route, the input processing module is configured to prompt the user for additional input indicating whether the curve or line is a request for a route.

13. The article of manufacture of claim 12, wherein the input processing module is configured to store the annotation data in response to the additional input indicating that the curve or line is not a request for a route.

14. The article of manufacture of claim 8, wherein, to determine whether the curve or line corresponds to a request for a route, the input processing module is configured to compare the curve or line to locations and road segments presented at the zoom level applied to the map at the time the curve or line was received.

15. A computer-implemented process comprising:
processing, using a processor, user input in memory, the user input representing a curve or line at a location on a graphical representation of map data presented by a graphical user interface at a zoom level;
determining whether the curve or line corresponds to an input for an annotation or a request for a route between geographic locations corresponding to the location of the curve or line on the graphical representation of the map at the zoom level, using a function comparing the curve or line to the map data at the zoom level;
in response to determining that the curve or line corresponds to the request for the route, generating data representing one or more routes between the geographical locations corresponding to the curve or line, based on at least the map data and the geographic locations corresponding to the curve or line; and
in response to determining that the curve or line corresponds to the annotation, generating annotation data based on the curve or line, and storing the generated annotation data in the storage, wherein the annotation data comprises a data structure including data based on the user input and representing the annotation, data representing a geographic location corresponding to the location of the curve or line on the graphical representation of the map data, and the zoom level.

16. The computer-implemented process of claim 15, wherein determining comprises comparing the curve or line to a straight line between end points defined by the curve or line.

17. The computer-implemented process of claim 15, wherein determining comprises comparing the curve or line to closest road segments visible in the graphical representation of the map at the zoom level between end points defined by the curve or line.

18. The computer-implemented process of claim 15, wherein determining comprises comparing the curve or line to a route between end points and through waypoints defined by the curve or line.

19. The computer-implemented process of claim 15, further comprising prompting the user for additional input indicating whether the curve or line is a request for a route.

20. The computer-implemented process of claim 19, further comprising storing the annotation data in response to the additional input indicating that the curve or line is not a request for a route.

* * * * *